United States Patent [19]

Winterbottom

[11] 4,143,802

[45] Mar. 13, 1979

[54] FLUXLESS BRAZE PROCESSING OF ALUMINUM

[75] Inventor: Walter L. Winterbottom, Farmington Hills, Mich.

[73] Assignee: Ford Motor Company, Dearborn, Mich.

[21] Appl. No.: 839,707

[22] Filed: Oct. 5, 1977

[51] Int. Cl.$^2$ .............................................. B23K 1/04
[52] U.S. Cl. .................................. 228/217; 228/219; 228/221; 228/239
[58] Field of Search ............... 228/217, 219, 221, 239; 428/654; 75/148

[56] References Cited

U.S. PATENT DOCUMENTS

| | | | |
|---|---|---|---|
| 3,673,678 | 7/1972 | Moreau et al. | 228/219 |
| 3,782,929 | 1/1974 | Werner | 75/148 |
| 3,807,033 | 4/1974 | Schoer et al. | 228/221 |
| 3,811,177 | 5/1974 | Schoer et al. | 228/219 |
| 3,891,400 | 6/1975 | Robinson | 428/654 |
| 3,898,053 | 8/1975 | Singleton, Jr. | 428/654 |
| 3,963,453 | 6/1976 | Singleton, Jr. | 428/654 |
| 3,963,454 | 6/1976 | Singleton, Jr. | 428/654 |

Primary Examiner—C.W. Lanham
Assistant Examiner—K. J. Ramsey
Attorney, Agent, or Firm—Joseph W. Malleck; Olin B. Johnson

[57] ABSTRACT

A method of fluxless brazing of aluminum parts is disclosed. Gaseous species, such as $O_2$ and $H_2O$, which inhibit wetting are controlled by rapid heating (at least 100° C./min) through a critical temperature range (such as 400°–590° C.) during heat-up to brazing temperatures. The formation of porosity through the oxide film and the collection of a promoter and wetting agent at the interface with the oxide film will thus occur simultaneously precluding disruption of wetting action by gaseous $O_2$ or $H_2O$. Wicking of the wetting agent through the film porosity in the critical temperature range will then take place because of the limited time available for the reaction of gaseous $O_2$ and $H_2O$ with the film to form a duplex oxide. Heating may be carried out in a vacuum of $10^{-3}$ Torr or less or in an inert atmosphere with pulsed heating, provided the critical heating rate is observed in said critical temperature range.

4 Claims, No Drawings

FLUXLESS BRAZE PROCESSING OF ALUMINUM

BACKGROUND OF THE INVENTION

Due to the decreasing supply of copper conventionally employed in automotive heat exchangers, aluminum has become important as an alternative material source. However, in a number of processes used in fabricating aluminum parts, such as brazing required in an automotive heat exchanger, the stability of the surface oxide film, present on aluminum, is a definite impediment. In brazing, the film acts as a barrier to wetting and flow of the filler metal required for joint formation. Oxide removal and prevention of reoxidation are the principal requirements for a successful aluminum joining method.

Fluxless or vacuum brazing has assumed a position of commercial importance because it does not require the removal of a flux residue and reduces the susceptibility to aqueous corrosion of parts having this flux residue. Vacuum or fluxless brazing essentially comprises placing the assembled structure to be brazed into a heating furnace with a filler metal disposed at the sites to be joined. The furnace is evacuated to a vacuum level of about $10^{-4}$–$10^{-5}$ Torr and simultaneously heated to a temperature in excess of the melting point of the filler metal, but below the melting point of the base metal to be joined. It has been conventional to employ a furnace which heats at a rate of approximately 15° C./min so that the entire brazing operation is accomplished within a period of about 15 to 18 min.

Although in most instances, vacuum brazing produces a sound joint, there are instances when certain vapor phase constituents within the furnace atmosphere degrade braze performance. Degradation occurs during the stage when the promoter reacts with the oxide film and later when capillary forces tend to draw at least part of the fluidized filler metal through the oxide film. In spite of the presence of promoter agents to facilitate wetting of the oxide film, the presence of such vapor phase constituents counteract the beneficial effect of the promoter agents.

SUMMARY OF THE INVENTION

A primary objective of this invention is to provide an improved method of fluxless brazing of aluminum components characterized by increased economy and lower capital costs, as well as a more perfect braze. In part, the economy should result from reduced vacuum apparatus requirements for the method. The requirements are lowered through the use of a low vacuum pumping system establishing a vacuum level of about $10^{-3}$ Torr, as opposed to the higher vacuum requirements of the prior art which have been normally in the range of $10^{-5}$ Torr.

Another objective of this invention is to provide a method of fluxless brazing which is effective to control gas species of $O_2$ and $H_2O$ during vacuum brazing so that such gaseous species do not interfere with wetting of the oxide film and the accompanying braze performance degradation.

Features pursuant to the above objectives comprise:
 (a) isolation of a critical temperature zone through which the structure to be brazed must be heated, such critical temperature zone being related to the condition during which the aluminum oxide film becomes porous and during which the promoting or gettering agents of the filler metal chemically react with the oxide film to promote wetting and during which a wicking action of the molten braze filler metal takes place through such porosity (such critical range having been isolated to be 400°–565° C. for a filler metal containing magnesium);
 (b) regulating the heating rate of the assembly to be brazed when passing through said critical temperature zone, said heating rate being at least 100°–150° C. per minute.

DETAILED DESCRIPTION

The surface film of an aluminum part or an aluminum alloy is in many respects the key to the properties and potential utility of this material. The film is a refractory oxide, ordinarily thin, self-healing, and covers the part surface to provide inertness of this otherwise highly reactive metal. In brazing, the oxide film acts as a barrier to the wetting and flow required in joint formation. In vacuum brazing, the mechanism for removal of the oxide barrier has not been completely understood. It is now recognized in accordance with this invention, that promoter agents, those which are capable of reducing the aluminum oxide film, and which are also capable of acting as a gettering agent for oxygen and water in the brazing chamber, must be used. The promoter and gettering agent is incorporated into the filler metal as a ternary addition, so that the filler metal for carrying out brazing of aluminum may consist of an aluminum-silicon-promoter alloy. In many ways magnesium is the most select promoter. One of the most important properties of the promoter, and particularly magnesium, is its high volatility at temperatures well below the eutectic melting point of the filler metal. Magnesium for example, will have a vapor pressure of approximately $10^{-3}$ Torr at 300° C.

The vapor transport of magnesium vapor through the oxide film has not been fully appreciated, certainly not in connection with the timing of how porosity develops in the oxide film. The promoter, such as magnesium influences the formation of porosity. It is believed that magnesium induces a change of the amorphous oxide structure to one which has a crystalline body phase, the change being induced at a lower temperature.

However, this invention finds that porosity in the oxide film can be a liability if it does not occur at the right time in the brazing sequence. Porosity is roughly desirable only after the filler metal melts; at this stage magnesium will react with the oxide film and induces wicking of the filler metal up into the film causing the film to break up, disintegrate and dissolve; this allows consequent wetting of the base aluminum metal. However, this role of porosity is compromised by the presence of trace amounts of $O_2$ or $H_2O$ in the vacuum chamber. When porosity is present in the film slightly prior to the evolution of magnesium from the solid filler metal, $O_2$ and $H_2O$ will react with the oxide film and form still more oxide or a duplex oxide. This subsequently prevents the promoter from reacting properly with the original oxide film when porosity does develop. As a consequence, the oxide film will float on top of the fluidized filler metal and little or no wetting of the base metal will occur. Some means is necessary to delay the formation of porosity in the oxide film.

By use of mass spectrometry, it has been determined that magnesium has two different vaporization bursts from the solid filler metal. It has been found that the oxide film is protective below and porous above some critical temperature range, and only vapor phase transport through a porous oxide can account for the kinetic behavior of the magnesium wetting. The magnitude of the initial burst effect is a measure of the buildup in magnesium concentration at the filler metal-oxide interface that occurs during heating prior to the formation of the pores. A slow rate of heating does not produce the burst effect presumably because the transport of magnesium to the interface at an appreciable rate and the development of pores are concurrent processes. At lower temperatures (in the range of 400°–500° C. the vaporization step or the dissociation of $Mg_2Si$ controls the process kinetics. With rapid heating the protective oxide film can be maintained in a nonporous condition to higher temperatures thereby reducing the extent of reaction between gaseous contaminants and the braze promoters.

It has been determined that the mechanism of filler metal wetting is dependent upon the following characteristics:

(a) the normally non-porous oxide film must be provided with pores the formation of which is both time and temperature dependent. To illustrate, initial porosity develops at a lower temperature limit of about 350° C. with rates of heating below 100° C./min and can be limited to initiation at about 525° C. with heating rates of 200° C./min, (b) the transport of magnesium vapor through such porosity is dependent upon the state of the filler metal: (a) in molten filler metal the transport is rapid, and (b) in solid filler metal the dissociation of $Mg_2Si$ and diffusion limits transport, (c) at the eutectic melting point of the filler metal alloy (551° C.), the wetting of the oxide produces a wicking action of the filler metal through the porous oxide film to yield a clean wettable liquid layer on the opposite side thereof, and (d) above 565° C., the filler metal becomes fully molten where macroscopic flow takes place.

As mentioned earlier, a phenomenon that disrupts the wetting process is the presence of vapor phase constituents of $O_2$ and $H_2O$, which if present, in sufficiently high concentrations can completely change the progress of said charactertistics (a)-(d) and thereby result in a poor braze.

Magnesium, of course, is considered an important element in overcoming these vapor phase constituents since magnesium acts as a getter and has high volatility and reactivity with $O_2$ and $H_2O$. In spite of magnesium's physical characteristic as a getter, its presence in the process cannot completely prevent this degradation.

According to this invention, if the time spent in the temperature range of 400°–500° C. is shortened to 1–2 minutes or less, the interference from vapor phase constituents can be reduced to a tolerable level. In vacuum brazing, the maintenance of a low partial pressure of water and oxygen is an essential requirement and is responsible for the high vacuum requirements of the presently known process. By limiting the time spent in said critical temperature range, it is possible to reduce the susceptibility of the process to these contaminants by limiting the extent of their reaction with the oxide film. It has been found that a heating rate of approximately 100°–150° C. per minute in the temperature range of 400°–565° C. is necessary to overcome this problem and at the same time reduce the vacuum apparatus requirements so that a low vacuum fore-pump is all that is required for the process.

Accordingly, a preferred method for carrying out this invention, is as follows:

1. An aluminum based structure is prepared by forming sheets of vacuum braze clad alloys. The clad sheets are formed and assembled into the usual configuration for a heat exchanger. The assembly is fixtured to maintain proper joint fit-up during the braze process.

2. Filler metal is located at the desired joining sites as a result of the cladding of the sheets which brings the filler metal into play no matter where the joint is disposed. In instances where clad sheet is not employed, filler metal must be carefully deposited at the desired sites.

3. The structurally assembled parent members are then placed into a furnace for heating while exposed to an inert atmosphere at a vacuum of about $10^{-3}$ Torr; the heating rate must be critically controlled as the assembly is heated through the temperature zone of 400°–590° C. The heating rate in this critical zone must proceed at a rate of 100°–150° C. per minute.

4. When the assembly reaches 590° C., heating is further carried out at a slower rate and the assembly is raised to a brazing temperature conforming with the knowledge of the prior art.

As a result of practicing the above sequence of steps, the oxide film will develop porosity initially at about 400° C.; as heating proceeds above this temperature, $Mg_2Si$ will dissociate allowing sufficient magnesium to collect and react with the porous oxide. As the temperature is raised further to 561° C., a wicking action or capillary movement of the filler metal will take place through such porosity, even though the filler metal is in a simi-mushy condition and too viscous to flow appreciably at this stage. After the temperature level of 565° C. is reached, the filler metal becomes more fluid and the flow required in joint filling can be accommodated under regular processes. However, by controlling the rate of heating, the interference of vapor phase constituents will be substantially eliminated and the promotion of a wetted aluminum surface by the filler metal through the oxide film will take place. Superior quality brazing by the vacuum technique can then result at pressures in the $10^{-3}$ Torr range.

An alternative mode to heating in a vacuum is the pulsed heating of the brazing assembly in an inert gas. The brazing assembly can be transferred between inert gas volumes at different hot temperatures or pulsed radiant heating can be utilized. However, the heating rate of 100°–200° C./min is observed during the time the assembly experiences a temperature change in the range of 400°–590° C., the deterioration of the brazing process by $O_2$ and $H_2O$ is eliminated. As in the preferred mode, the magnesium vapor will react with the oxide film at a moment when the film first begins to become porous. Magnesium atoms will incorporate themselves in the pores of the film forming a spinel (Mg—Al cations in an oxygen lattice. This spinel is wettable and allows the semi-fluid promoter to be picked up by capillary action and be wicked therethrough.

I claim:

1. A method of fluxless brazing of aluminum parts comprising:
   (a) preparing and structurally relating together base metal parts, consisting of at least aluminum or aluminum alloy, to form an assembly,
   (b) depositing a filler metal consisting essentially of an aluminum-silicon-magnesium alloy, said metal being deposited at joining sites for said assembly, (c) subjecting said assembly to heating within a furnace and controlling the heating rate of the assembly therein so that when the assembly experiences a temperature within the range of 400°-590° C., the heating rate is sufficiently rapid to avoid porosity in any oxide film on said assembly and avoid reactions of the aluminum in said assembly with gaseous oxygen or water in the environment surrounding said assembly within the furnace, and (d) continuing said heating of said assembly above said critical temperature range to effect brazing.

2. A method of fluxless brazing of aluminum parts, comprising:

(a) preparing and structurally relating together base metal parts consisting of aluminum or an alloy thereof to form an assembly, (b) depositing a filler metal alloy at joining sites of said assembly, said filler metal alloy having an aluminum base and containing a promoter and gettering agent selected from the group consisting of magnesium, rare earch metals, beryllium, scandium, yttrium, calcium, strontium, and lithium, (c) subjecting said assembly and deposited filler metal to heat while exposed to an inert or low vacuum environment, said low vacuum when employed being characterized by a pressure of less than $10^{-3}$ Torr, said heat being applied so that when the assembly experiences a critical temperature in a range of 400°-590° C. the heating rate is at least 100° C. per minute whereby the time period during which said assembly is in said critical temperature range is less than two minutes and, (d) continuing said heating beyond said critical temperature range to effect brazing.

3. The method as in claim 2 in which said heat is applied by pulsing to delay the formation of porosity in the oxide film on said base metal parts as well as the filler metal until said promoter dissociates from said filler metal, said heat pulsing being carried out particularly to provide a fluctuating heating rate of between 50° C./minute to over 100° C./minute when the base metal parts are at a temperature condition less than 545° C.

4. A method of brazing of assembly having base metal parts and a filler metal with magnesium disposed at the joining sites, comprising:

(a) heating a brazing assembly in an inert atmosphere or vacuum of less than $10^{-3}$ Torr to a temperature at which the oxide film on said base metal parts begins to form pores, (b) controlling the heating rate at the condition of (a) so as to be in excess of 100° C./minute until said metal parts exceed 535° C., and (c) continuing to heat said assembly until the metal parts have been wetted by the filler metal at the joining sites.

* * * * *